(12) United States Patent
Hayakawa

(10) Patent No.: US 9,135,607 B2
(45) Date of Patent: Sep. 15, 2015

(54) INFORMATION PROCESSING APPARATUS INFORMATION PROCESSING METHOD AND STORAGE MEDIUM

(75) Inventor: Takeshi Hayakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 109 days.

(21) Appl. No.: 13/588,927

(22) Filed: Aug. 17, 2012

(65) Prior Publication Data

US 2013/0054717 A1 Feb. 28, 2013

(30) Foreign Application Priority Data

Aug. 23, 2011 (JP) ................................. 2011-181634

(51) Int. Cl.
  *G06F 15/16* (2006.01)
  *G06Q 10/10* (2012.01)
(52) U.S. Cl.
  CPC .................................... *G06Q 10/107* (2013.01)
(58) Field of Classification Search
  CPC ......... H04L 63/20; H04L 51/08; H04L 51/18; G06F 17/30165; G06F 17/30067; G06F 21/6218; G06Q 10/10
  USPC ........................................................ 709/206
  See application file for complete search history.

(56) References Cited

U.S. PATENT DOCUMENTS

| | | | |
|---|---|---|---|
| 7,730,147 B1 * | 6/2010 | Derhak et al. ................. | 709/206 |
| 8,713,109 B1 * | 4/2014 | Baker et al. .................... | 709/206 |
| 2003/0097361 A1 * | 5/2003 | Huang et al. ................... | 707/10 |
| 2005/0198166 A1 * | 9/2005 | Kawaji ........................... | 709/206 |
| 2007/0179967 A1 * | 8/2007 | Zhang ............................ | 707/102 |
| 2008/0126353 A1 * | 5/2008 | Baude et al. ..................... | 707/10 |
| 2008/0256194 A1 * | 10/2008 | Girouard et al. ............... | 709/206 |
| 2009/0049144 A1 * | 2/2009 | Suzuki et al. ................. | 709/206 |
| 2009/0319584 A1 * | 12/2009 | Song .............................. | 707/204 |
| 2011/0016188 A1 * | 1/2011 | Buchheit et al. .............. | 709/206 |
| 2012/0078845 A1 * | 3/2012 | Kasbekar et al. ............. | 707/640 |
| 2012/0303729 A1 * | 11/2012 | Li et al. ........................ | 709/206 |

FOREIGN PATENT DOCUMENTS

JP 2006-244033 A 9/2006

* cited by examiner

*Primary Examiner* — Duyen Doan
(74) *Attorney, Agent, or Firm* — Canon U.S.A., Inc. IP Division

(57) ABSTRACT

If a stored electronic mail is selected, an information processing apparatus determines whether information about storage location exists in the attribute information of the electronic mail and, if the information about storage location exists in the attribute information of the electronic mail, the information processing apparatus acquires mail identification information for identifying an electronic mail from the attribute information and issues to the mail unit instructions for starting a specified electronic mail including the mail identification information and the information about storage location. The information processing apparatus searches for the electronic mail identified by the mail identification information from the storage location indicated by the information about storage location based on the information about storage location and the mail identification information included in the instructions and, if the electronic mail is found, the information processing apparatus starts the processing displaying the selected electronic mail.

9 Claims, 21 Drawing Sheets

FIG.7

| 701 |
|---|
| REPLY |
| DESTINATION |
| Cc: |
| TITLE: |
| MAIL TEXT |

FIG.9

INFORMATION ABOUT PROPERTY OF FILE                901

| MANAGEMENT ID | FILE NAME | MAIL FOLDER | Message-ID |
|---|---|---|---|
| 1 | STOCK STATUS OF DIGITAL CAMERAS.yyy | FOLDER B | 123456 |
| 2 | Abc.xxx | – | – |

MAIL APPLICATION

FIG.13

1301 — mail.exe

1302 — mail.exe /FOLDER B "123456"

FIG.15

1501 — mail.exe /FOLDER B "123456"
(1302)

1502 — mail.exe / "123456"

1503 — mail.exe /STOCK STATUS OF DIGITAL CAMERAS.yyy

FIG.19

INFORMATION ABOUT PROPERTY OF FILE — 1901

| MANAGEMENT ID | FILE NAME | TITLE | MAIL FOLDER | Message-ID |
|---|---|---|---|---|
| 1 | FINAL RESULTS.yyy | STOCK STATUS OF DIGITAL CAMERAS | FOLDER B | 333333 |

1902 — (FILE NAME, TITLE)
1903

- STOCK STATUS OF DIGITAL CAMERAS.yyy
- Re: STOCK STATUS OF DIGITAL CAMERAS.yyy —2102(1702)
- Re: Fw: STOCK STATUS OF DIGITAL CAMERAS.yyy
- FINAL RESULTS.yyy

2103(1703)

RETURN FILE NAME TO ORIGINAL —2104

FILE MANAGEMENT APPLICATION A

INFORMATION PROCESSING APPARATUS INFORMATION PROCESSING METHOD AND STORAGE MEDIUM

BACKGROUND OF THE INVENTION

1. Field of the Invention

The present invention relates to an information processing apparatus, an information processing method, and a storage medium.

2. Description of the Related Art

In the business using electronic mail, it is important to manage electronic mail and a file related to electronic mail. For example, there may be a facsimile file about a received request placing an order, electronic mail transmitted to confirm stock status, and spreadsheet file for reporting the stock status, when doing business with respect to an order from a customer for a commercial product.

An attached file transmitted and received along with electronic mail is associated with the electronic mail to manage the electronic mail and other files. Japanese Patent Application Laid-Open No. 2006-244033 discusses a technique for displaying the associated electronic mail by the application executing the attached file.

In the technique discussed in Japanese Patent Application Laid-Open No. 2006-244033, the application executing the attached file needs a function to start a mail application. For this reason, in the electronic mail which receives unspecified files, usage is limited. Further, the function is ineffective for the electronic mail without the attached file.

Then, there is a method for managing the electronic mail and a file related to the electronic mail in one folder. An application for transmitting and receiving electronic mail (hereinafter referred to as mail application) also has a function to manage the electronic mail by sorting the electronic mails by folders but has a problem that it cannot manage a file different in a transmission and reception path from the electronic mail. The mail application has a problem in that the number of mails transmitted and received is increased day by day, so that a large number of folders is created, mails are dispersed.

A file management system is used to avoid such dispersion. The mail application has a function to export transmitted and received electronic mails. The file management system manages the exported electronic mails. The mail application stores electronic mail data as a file according to storage file format. The storage file format is an eml format, for example. Hereinafter, electronic mail stored according to the storage file format is referred to as storage mail.

If a plurality of storage mails exists in a folder, all storage mails within the folder sometimes need to be read because it may not be enough to read just one mail to acquire a sufficient amount of information. In addition, the transmission and reception record of storage mails sometimes needs to be searched to confirm if other relevant storage mails exist.

SUMMARY OF THE INVENTION

The present invention is directed to display storage mail along with information about a place where the storage mail is stored if a selected file is the storage mail.

According to an aspect of the present invention, an information processing apparatus includes a file management unit configured to manage a file and a mail unit configured to generate, transmit, and receive an electronic mail. If a stored electronic mail is selected, the file management unit determines whether information about storage location exists in the attribute information of the electronic mail and, if the information about storage location exists in the attribute information of the electronic mail, the file management unit acquires mail identification information for identifying an electronic mail from the attribute information and issues to the mail unit instructions for starting a specified electronic mail including the mail identification information and the information about storage location, and the mail unit searches for the electronic mail identified by the mail identification information from the storage location indicated by the information about storage location based on the information about storage location and the mail identification information included in the instructions and, if the electronic mail is found, the mail unit starts the processing displaying the selected electronic mail.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates an example of the mail application capable of editing a mail.

FIG. 9 illustrates an example of a data structure generated by the file management application.

FIG. 13 is an example of the starting command of the mail application.

FIG. 15 is an example of a starting command for the mail application.

FIG. 19 illustrates an example of the data structure generated by the file management application.

FIG. 21 illustrates an example of a file management application adaptable to the present exemplary embodiment.

DESCRIPTION OF THE EMBODIMENTS

Various exemplary embodiments, features, and aspects of the invention will be described in detail below with reference to the drawings.

A technique to be premised is described below. An information processing apparatus according to the exemplary embodiment described below includes a file management application which has a function to file document data generated by a general application on its own differently from an operating system.

Figure 1:
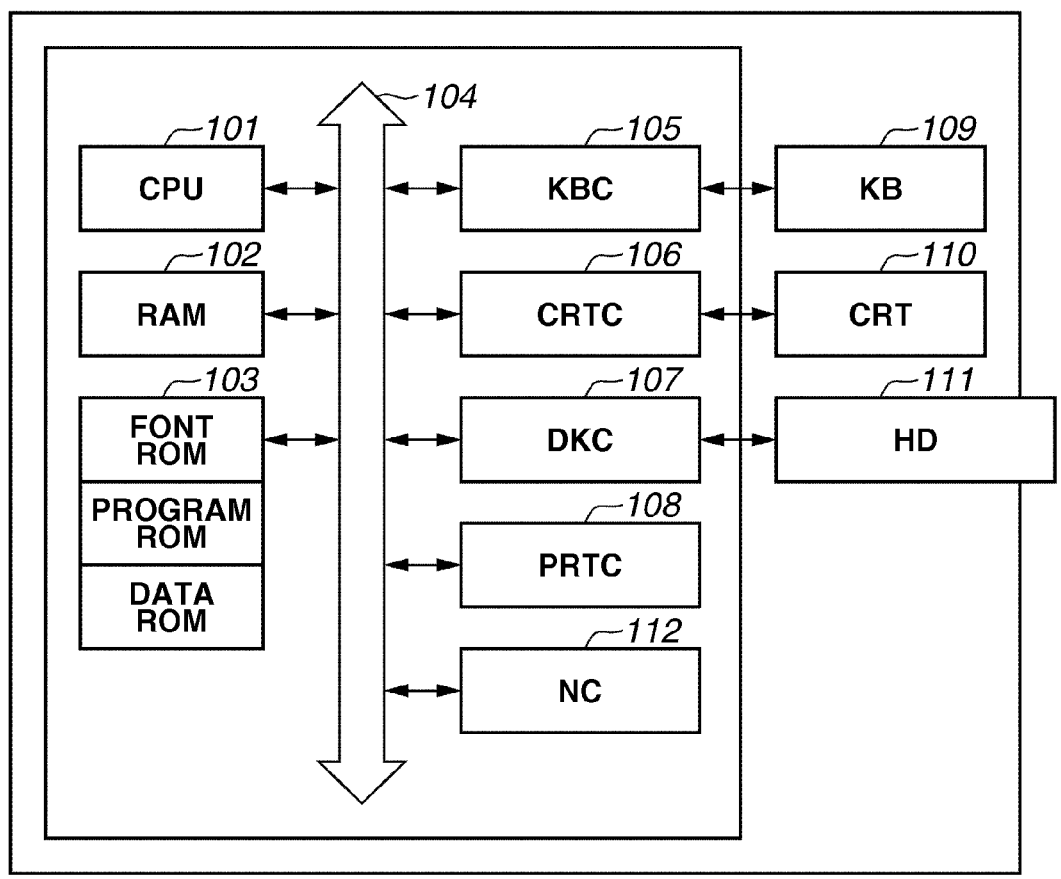
FIG. 1 is a block diagram illustrating an example of a configuration of an information processing apparatus suitable for the present exemplary embodiment.

FIG. 1 is a block diagram illustrating an example of a configuration of the information processing apparatus suitable for a first exemplary embodiment. In FIG. 1, a central processing unit (CPU) 101 executes an operating system (OS) loaded onto a random access memory (RAM) 102 from a read only memory (ROM) 103 or a hard disk 111 and programs such as general applications to realize a flow chart described below.

The RAM 102 functions as a main memory and a work area of the CPU 101. A keyboard controller (KBC) 105 controls a key input from a key board 109 and a pointing device (not illustrated). A cathode ray tube (CRT) controller (CRTC) 106 controls a cathode ray tube (CRT) display 110. A disk controller (DKC) 107 control access to the hard disk 111 and a flexible disk (FD) storing a boot program, various applications, font data, user files, and editing files described below. A printer control (PRTC) 108 controls the exchange of a signal with a connected printer. A network controller (NC) 112 is connected to a network to execute communication control processing with other apparatuses connected to a network.

The CPU 102 executes processing based on the program of a mail application to realize the function of the mail application. Furthermore, the CPU 102 executes processing based on the program of a file application to realize the function of the file application. Still furthermore, the CPU 102 executes processing based on the program of the OS to realize the function of the OS.

Figure 2:
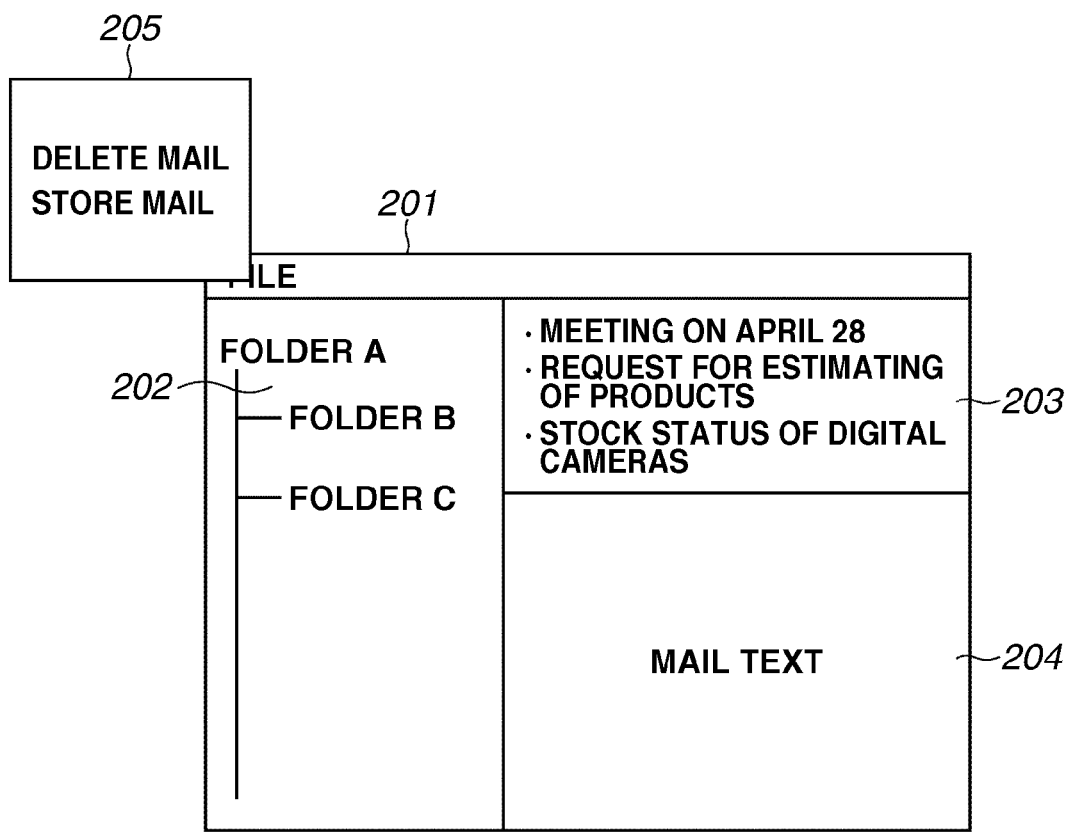
FIG. 2 illustrates an example of the mail application.

FIG. 2 illustrates an example of the mail application. The screen of mail (electronic mail) displayed by a mail application 201 includes a folder view 202 for managing mails sorted into folders, a mail list view 203 for displaying the mail in the folder, and a mail text view 204 for displaying the text of mail. A context view 205 is the one that instructs operation related to the mail included in the mail application 201. A user can specify mail to delete it from the context view 205 and instruct the storage of the mail. The mail list view 203 stores and displays three mails: "Meeting on Aril 28," "Request for estimating products," and "Stock status of digital cameras."

Figure 3:
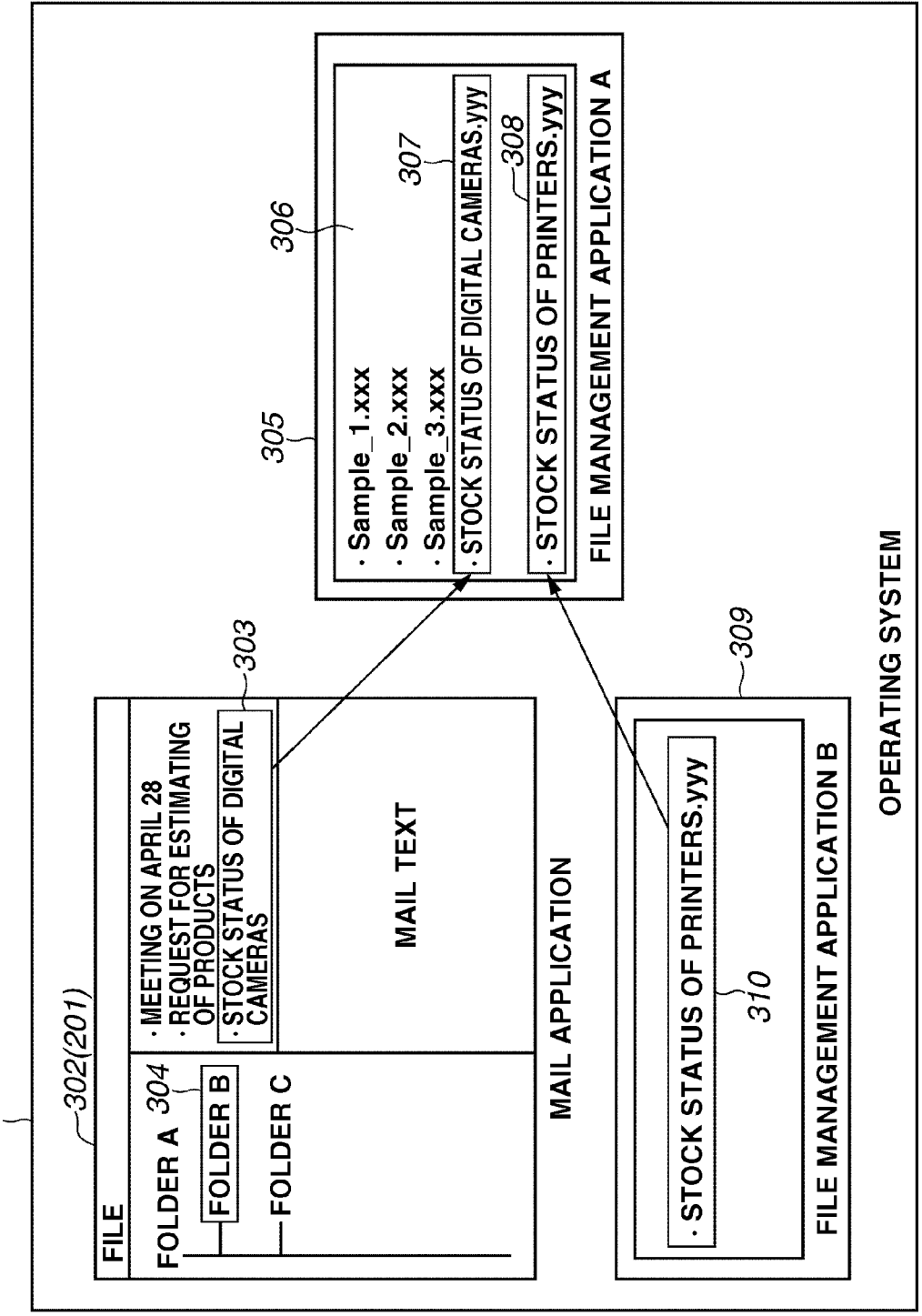
FIG. 3 illustrates an example of a file management application.

FIG. 3 illustrates an example of the file management application. The operating system 301 in FIG. 3 includes a mail application 302 and file management applications A305 and B309. The mail application 302 operates on the operating system 301. The mail application 302 is the same as the mail application 201 illustrated in FIG. 2. The file management applications A305 and B309 are screens for the file management application operating on the operating system 301. The operating system 301, the mail application 302, and the file management applications A305 and B309 operate within information processing apparatus illustrated in FIG. 1.

For the mail application 302, a folder B304 is selected by the user. Furthermore, mail 303 in the folder B304 is selected.

The file management application A305 manages some folders and files. A file management view 306 is a view for the file management application A305. Mail 307 is a mail imported into the file management application A305 from the mail application 302. The mail 307 is a mail generated by the mail storage function of the mail application 302. This is referred to as storage mail 307 in the present exemplary embodiment.

The storage mail 307 is added to the file managed by the file management application A305 in such a manner that mail 303 is dragged by a mouse from the mail application 302. The mouse cursor is moved to the file management view 306 and then the mail 303 is dropped to move the mail 303 to the file management application A305. This is a general drag and drop operation for a file in a personal computer and a function realized by the operating system 301 and an application.

The mail 308 is a mail generated by the mail storage function of the mail application 302. This is referred to as storage mail 308 in the present exemplary embodiment. The storage mail 308 has already been stored in the mail application 302 and managed by the file management application B309. The storage mail 308 is added to the file managed by the file management application A305 in such a manner that storage mail 310 is dragged by a mouse from the file management application B309. The mouse cursor is moved to the file management view 306 and dropped to move the mail 310 to the file management application A305. The storage mail 308 is a mail that is the storage mail 310 copied by the file management application A305 at the time of the drag and drop operation.

Figure 4:
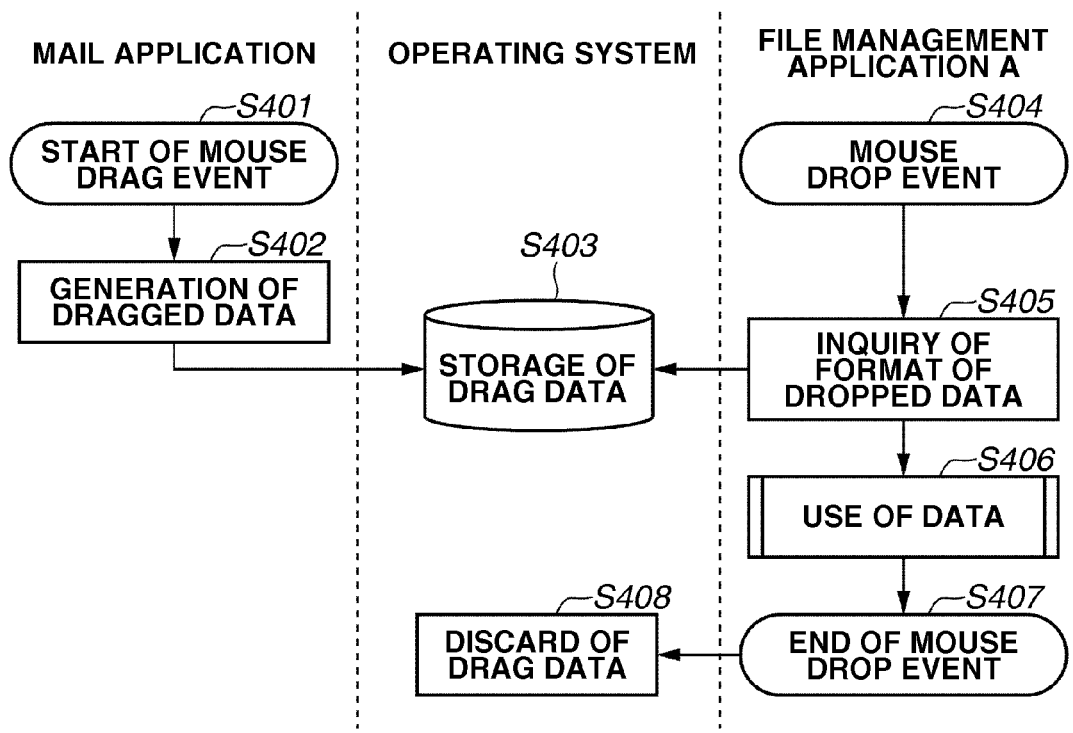
FIG. 4 illustrates processing of a file movement operation between conventional file management applications.

FIG. 4 illustrates processing of a file movement operation between conventional file management applications. In step S401, the mail application 302 receives a mouse drag event. In step S402, the mail application 302 generates the dragged data. Data to be generated is determined by the mail application 302.

In step S403, the operating system 301 is provided with instructions for the generation of the dragged data (S402) by the mail application 302 and stores the dragged data. The processing of steps S402 and S403 are generally performed via a framework provided by the operating system 301. The present exemplary embodiment does not depend on the framework which the operating system 301 has and the processing is regarded as that of the operating system 301 including the framework.

In step S404, the file management application A305 receives a mouse drop event. In step S405, the file management application A305 inquires of the operating system 301 about the format of the dropped data. The data dropped on the file management application A305 is the same as those dragged by the file management application A305. In other words, the data is the dragged data stored in the operating system 301 in step S403.

In step S406, the file management application A305 uses the dragged data based on the result of inquiry about the format. How to use the dragged data in step S406 is described below in FIG. 7. In step S407, the mouse drop event is ended. After the mouse drop event is ended, in step S408, the operating system 301 discards the dragged data stored in step S403.

Figure 5:
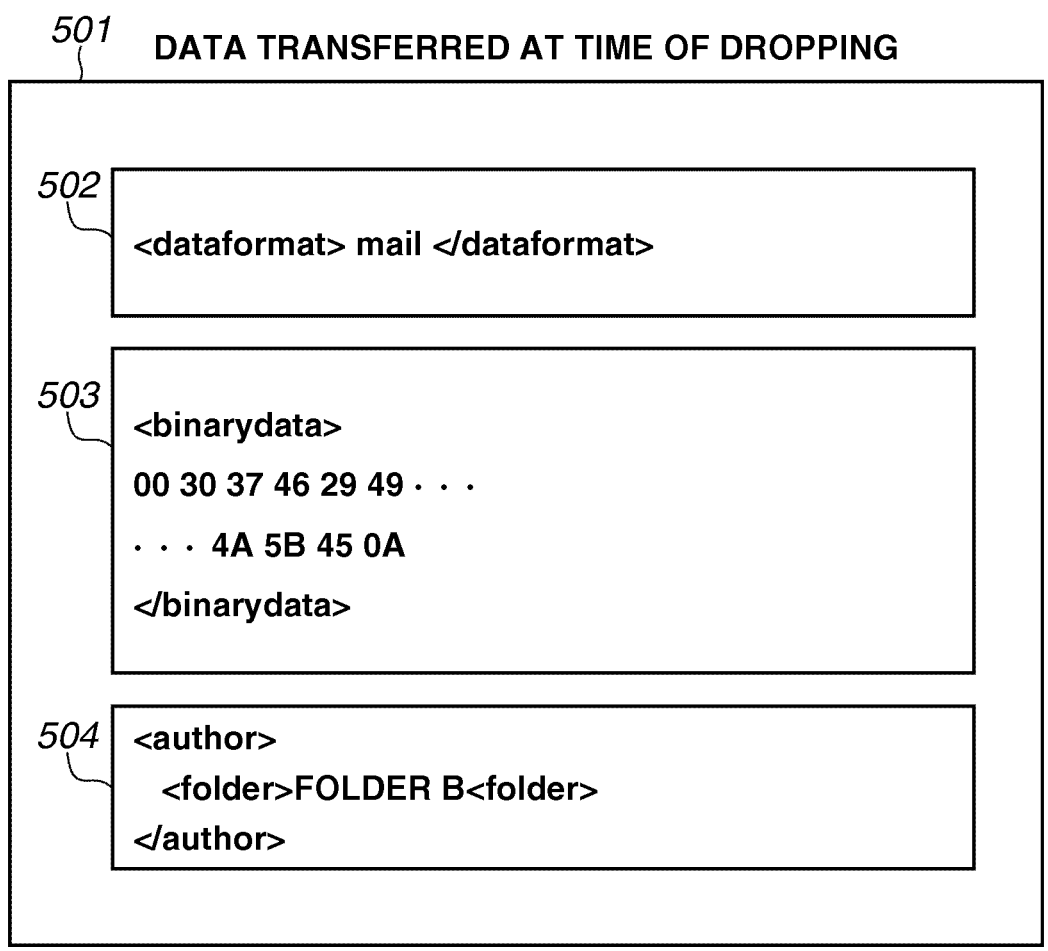
FIG. 5 is a chart illustrating an example of data structure generated at the time of drag and drop.

FIG. 5 is a chart illustrating an example of data structure generated at the time of the drag and drop. A data structure 501 is the one that is stored in the operating system 301 instructed by the mail application 302 using the storage area of the ROM 103 or the hard disk 111 of the information processing apparatus. The file management application A305 can receive the data structure 501 as dropped data from the operating system 301. The data structure 501 includes a portion 502 representing the data format and a portion 503 storing a data object.

The data format indicates "bit map" if a bit map is dropped and "text" if a character string is dropped. The type of the format is defined by the framework handled by the operating system 301. In the present exemplary embodiment, the data format 502 is mail because it is dragged from the mail application 302.

The data object 503 stores binary data of the dropped data. The file management application A305 can extract the data object 503 as an original data format. The mail application 302 uses binary data according to the format in which a mail is stored in the data object 503. The binary data is in the eml format, for example. The file management application A305 can create the storage mails 307 and 308 using the data object 503.

In the present exemplary embodiment, the data structure 501 has folder information 504 therein. The folder information 504 is a value indicating where the mail dragged from the mail application 302 exists in the folder. If the mail 303 is dropped, the dragged mail exists in the folder B304. Since the folder information 504 is the one that is provided by the mail application 302, if the storage mail 310 in the file management application B309 is dragged by the mouse, the folder information 504 is not generated.

Figure 6:
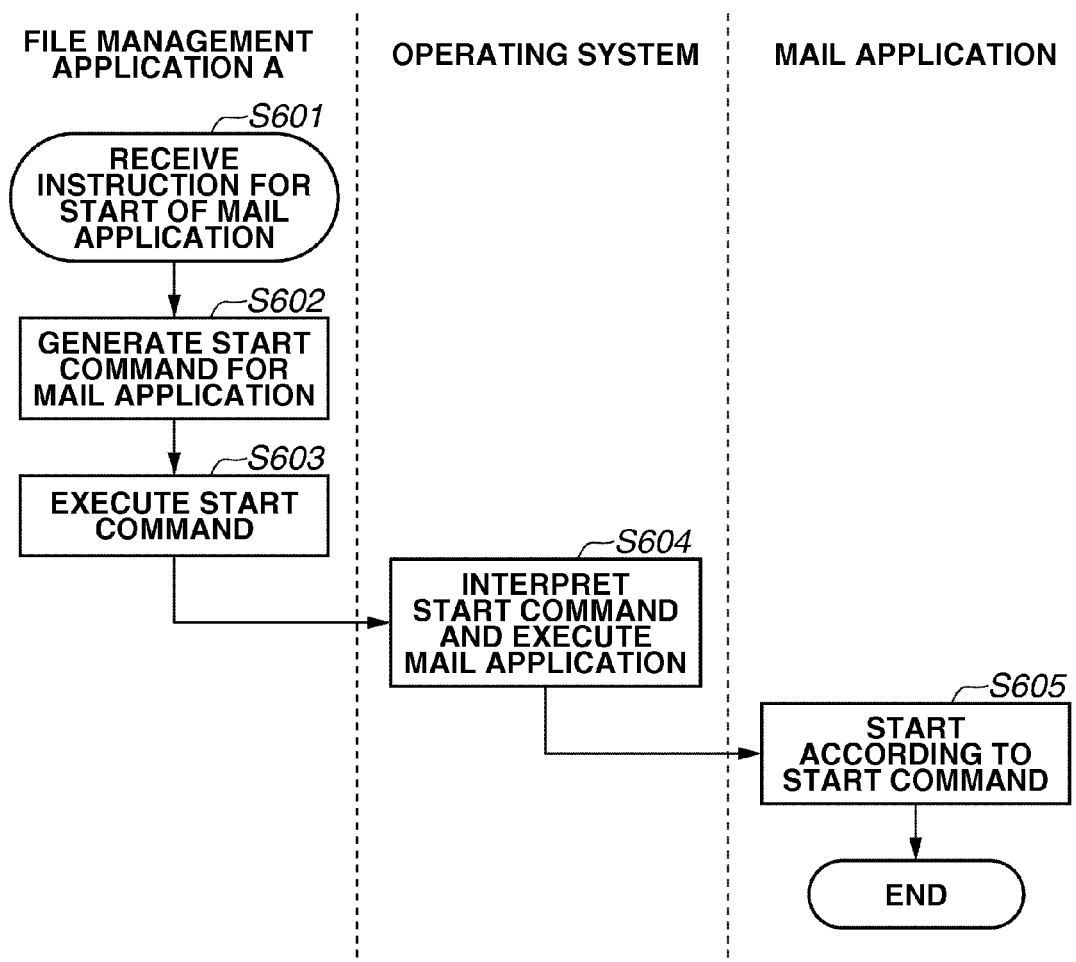
FIG. 6 is a flow chart illustrating an example of processing for starting a mail application from the file management application.

FIG. 6 is a flow chart illustrating an example of processing for starting the mail application from the file management application. In step S601, the file management application A305 is instructed to start the mail application by the user. The instruction is performed by the user selecting and clicking the storage mails 307 or 308.

In step S602, the file management application A305 generates a command for starting the mail application. In general, the command for starting the mail application is a command that instructs the framework provided by the operation system to perform the execution file path of the application. The addition of not only the execution file path of the application but also a boot argument or a parameter called option can change the boot operation of the application. A start command for starting the storage mail 307 in step S602 is a command specifying the storage mail 307 like "Process. Start ("C: File path/Stock status of digital cameras. yyy"). In step S603, the file management application A305 instructs the framework provided by the operation system to execute the start command in step S602.

In step S604, the operation system receives an instruction from the file management application A305 in step S603 and performs processing for starting the mail application. The command specified in step S603 is used to start the mail application. In step S605, the mail application performs start processing according to the specified command. In other words, the mail application is started while the storage mail 307 is editable as illustrated in FIG. 7.

Figure 7:
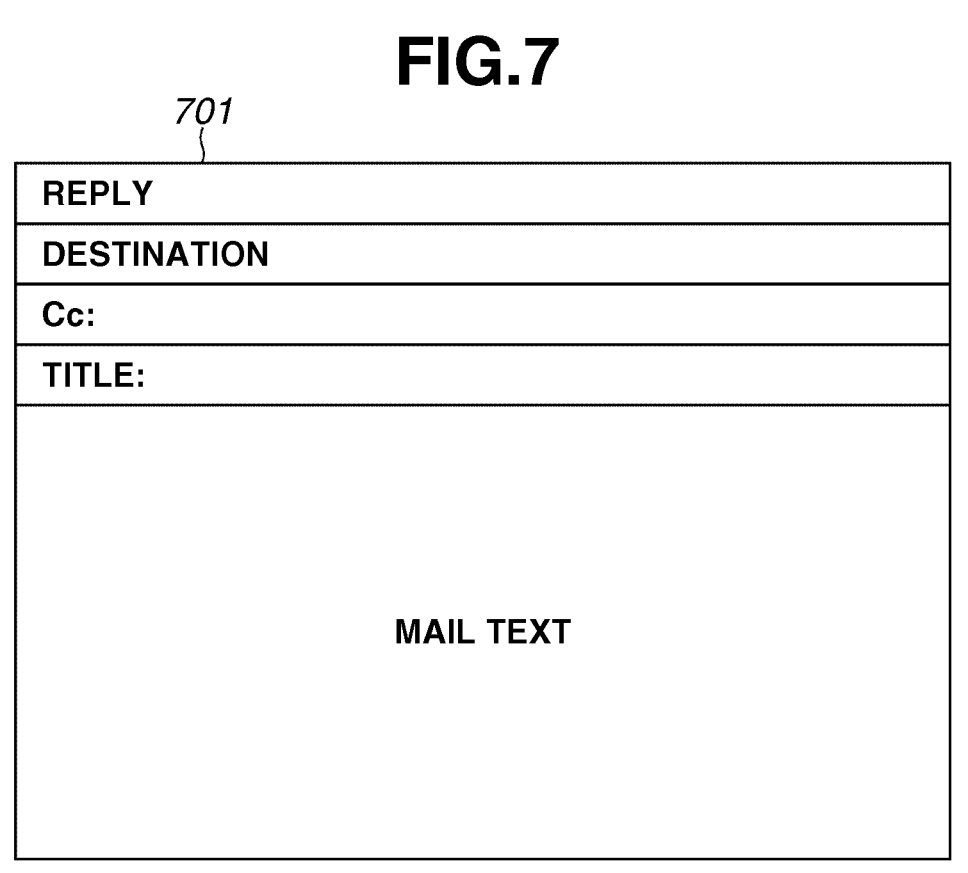

FIG. 7 illustrates an example of the mail application capable of editing a mail. A mail editing user-interface (UI) 701 illustrated in FIG. 7 is a mail editing UI of the mail application 302 started with the storage mail 307 editable in step 605 in FIG. 6. The mail editing UI 701 is not a UI including the folder view 202, the mail list view 203, and the mail text view 204, but a view for displaying only the contents of the storage mail 307. The contents of the storage mail 307 can be read on the mail editing UI 701, but the mail editing UI 701 is inappropriate if there is a plurality of storage mails, as described above.

Figure 8:
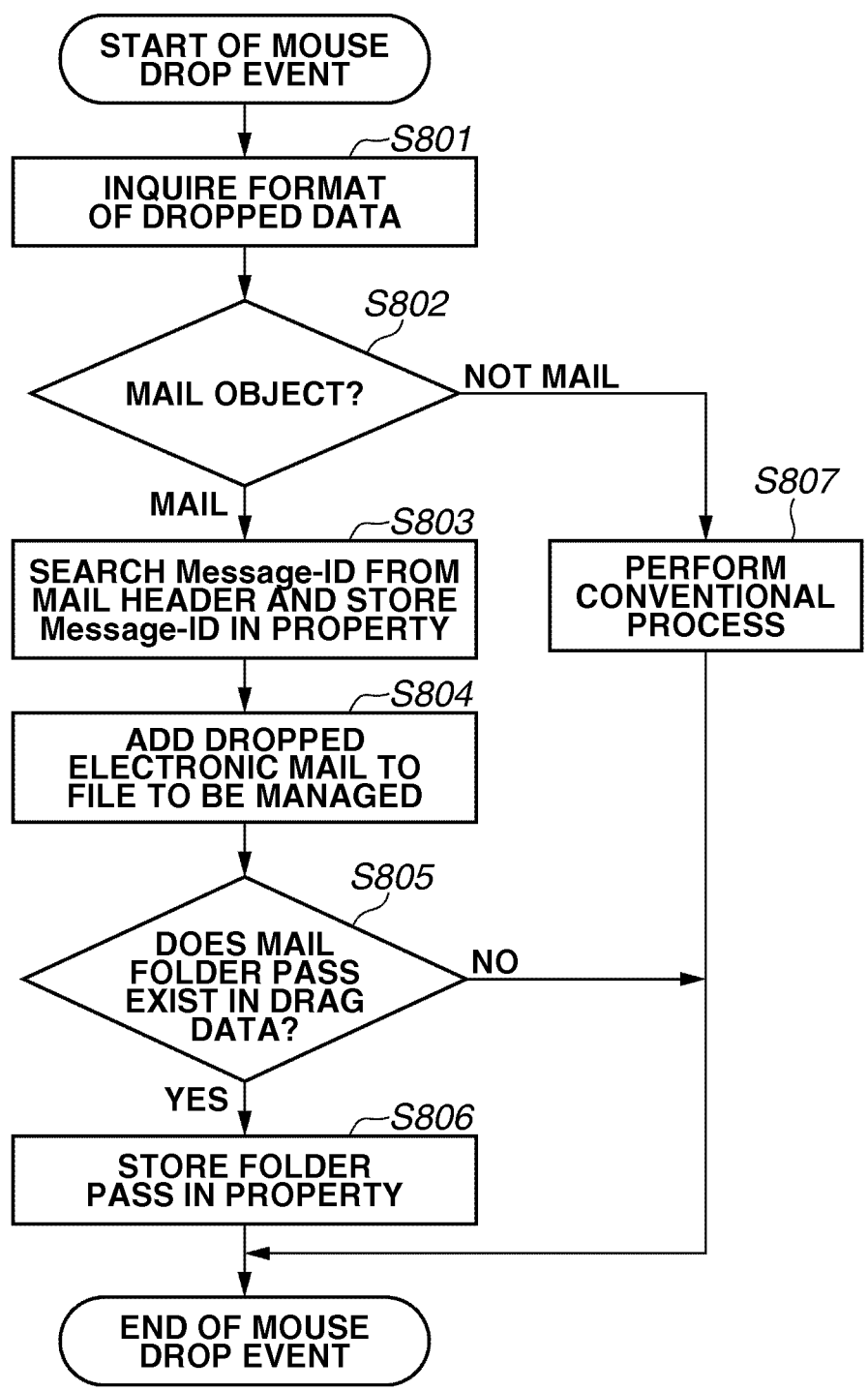
FIG. 8 is a flow chart illustrating an example of processing of the mail application and the file management application A.

A drag and drop operation for the file management application in the present exemplary embodiment is described below. FIG. 8 is a flow chart illustrating an example of processing of the mail application 302 and the file management application A305.

The file management application A305 receives a mouse drop event from the mail application 302. The mail 303 in the folder B304 is selected in this case.

In step S801, the file management application A305 inquires of the operating system 301 about the format of the dropped data to know the format of the dropped data. The format which the operating system 301 notifies to the file management application A305 is illustrated in FIG. 5. In the present exemplary embodiment, the format received from the file management application A305 is a mail.

In step S802, the file management application A305 determines whether the format inquired in step S801 is a mail (a mail object). If the file management application A305 determines that the format is not a mail object (NO in step S802), the processing proceeds to step S807.

In step S807, the file management application A305 adds a file to the file to be managed. As a result, the added file is displayed on the file management view 306. This is a process flow for a conventional drag and drop.

If the file management application A305 determines that the format is a mail object (YES in step S802), the processing proceeds to step S803. In step S803, the file management application A305 searches for Message-ID in the mail header portion from the data object 503 and stores the Message-ID as property information in the file management application A305. The Message-ID is an ID that identifies the mail included in a mail. The property information is an example of attribute information. The Message-ID is an example of mail identification information.

In step S804, the file management application A305 adds the data structure 501 generated by dropping the mail 303, to the file to be managed as the storage mail 307 which is stored according to the storage mail format.

In step S805, the file management application A305 refers to the folder information 504 in the data structure 501. If the file management application A305 finds information indicating the folder B304 in the folder information 504 (YES in step S805), the processing proceeds to step S806. If the file management application A305 does not find information indicating the folder B304 in the folder information 504 (NO in step S805), the mouse drop event is ended.

In step S806, the file management application A305 stores the information indicating the folder B304 found in step S805 as property information and the mouse drop event is ended. The information indicating the folder B304 is an example of information about storage location. The folder is an example of storage location.

FIG. 9 illustrates an example of a data structure generated by the file management application A305. A data structure 901 is the one that is stored in the operating system 301 using the storage area of the ROM 103 or the hard disk 111 of the information processing apparatus and generated by the file management application A305 based on the instruction of the drag and drop. The data structure 901 is property information of a file which the file management application A305 uses to manage the file. Hereinafter, the data structure 901 is referred to as file property information 901.

The file property information 901 is property information of a file which the file management application A305 uses to manage the file. The file property information 901 stores file information displayed on the file management view 306. A property item 902 includes a management ID for identifying a file, a file name, a mail folder, and Message-ID. The property item 902 may include creation date and file size which are general property information in addition to the above items. A property information 903 is the property information of the storage mail added to the file management application A305 in step S804. In other words, the property information 903 is the information stored in steps S803 and S806. In the item of the file name, an extension is added to the title of the mail 303, "Stock status of digital cameras". The item of the mail folder is "Folder B" of the selected folder B304. The item of the Message-ID is the value of the Message-ID read from the mail header in step S803.

Figure 10:
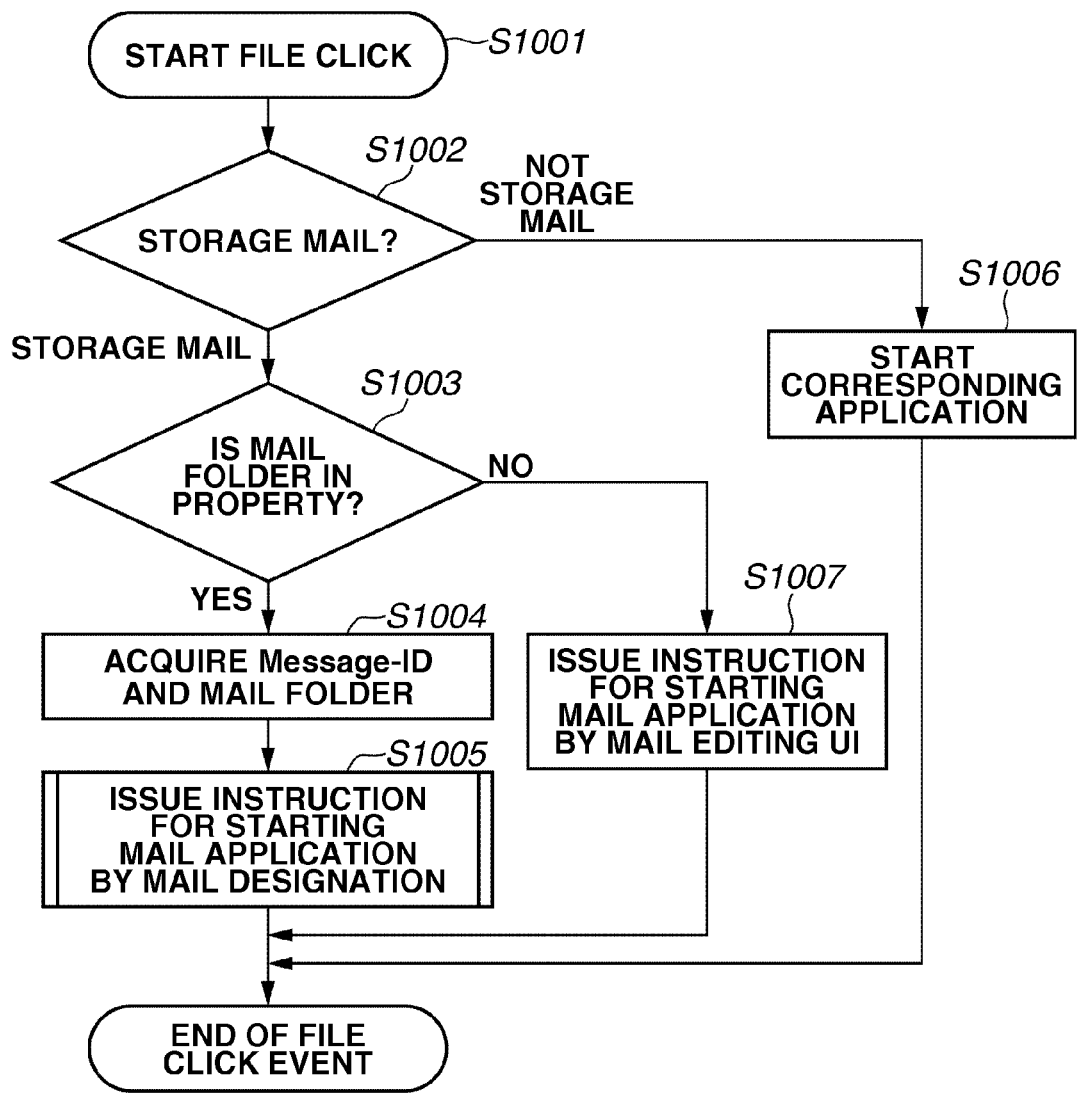
FIG. 10 is a flow chart illustrating an example of processing of the mail application and the file management application A.

Processing conducted when an operation is performed to click on a mail stored in the file management application is described below. FIG. 10 is a flow chart illustrating an example of processing of the mail application 302 and the file management application A305.

In step S1001, the file management application A305 is instructed to click on a file by the user. Here, the storage mail 307 in the file management view 306 of the file management application A305 is clicked on.

In step S1002, the file management application A305 determines whether the clicked file is the storage mail. If the file management application A305 determines that the clicked file is not the storage mail (NO in step S1002), the processing proceeds to step S1006.

In step S1006, the file management application A305 starts an application corresponding to the clicked file. If the file management application A305 determines that the clicked file is the storage mail (YES in step S1002), the processing proceeds to step S1003. In step S1003, the file management application A305 refers to the file property information 901 to determine whether the value of the mail folder exists in the storage mail 307.

If the value of the mail folder exists therein (YES in step S1003), the processing proceeds to step S1004. In step S1004, the file management application A305 acquires the values of the Message-ID and the mail folder from the file property information 901.

In step S1005, the file management application A305 instructs the mail application 302 to start. The flow of the processing is described in the subroutine illustrated in FIG. 11. If the value of the mail folder does not exist therein (NO in step S1003), the processing proceeds to step S1007. In step S1007, the file management application A305 instructs the mail application 302 to start the storage mail 307 on the mail editing UI.

The processing is similar to that for starting the mail application from the file management application illustrated in FIG. 6. As a result, the screen of the started mail application is the mail editing UI 701 of the mail application illustrated in FIG. 7.

Figure 11:
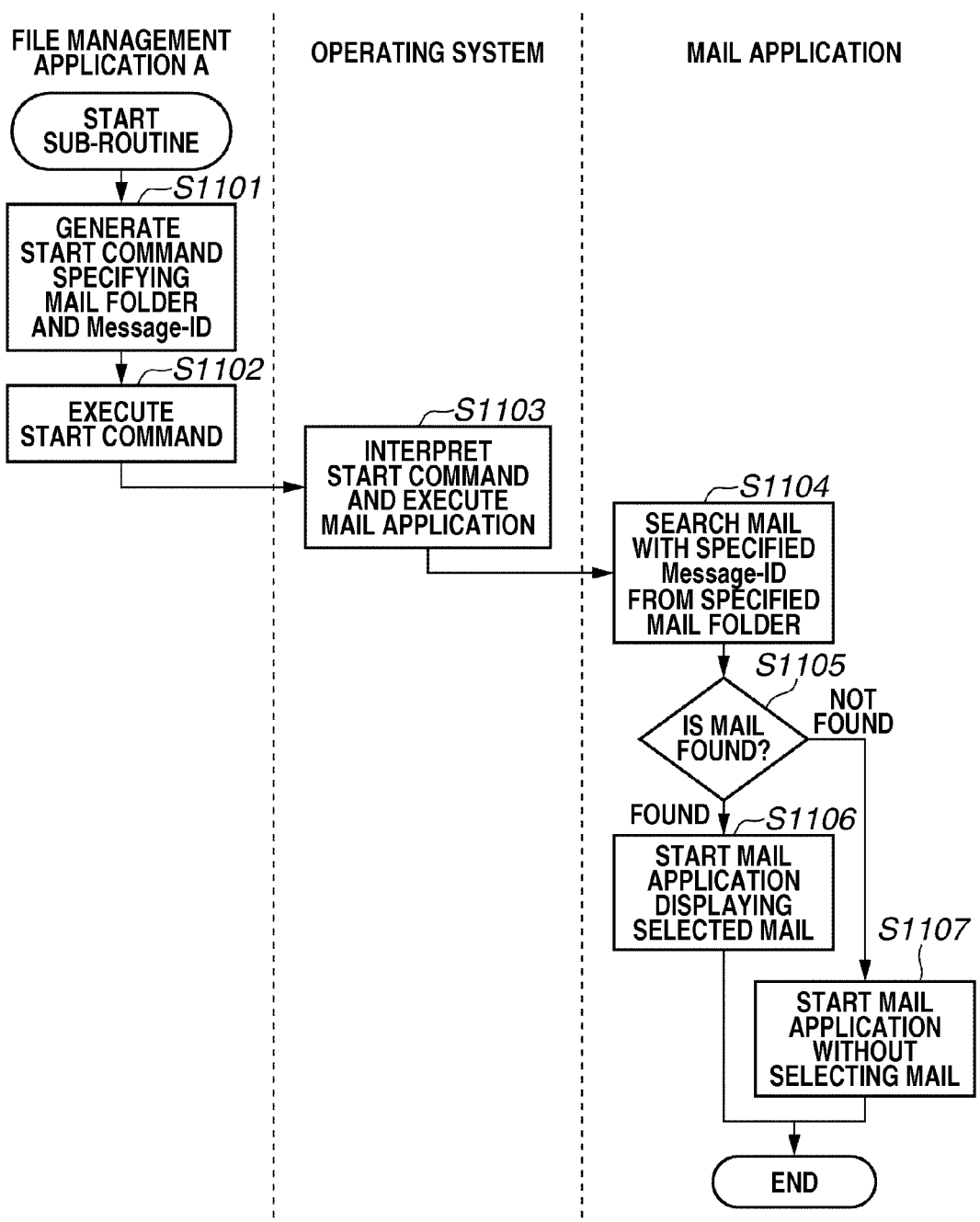
FIG. 11 is a flow chart illustrating an example of processing for starting the mail application by the file management application.

FIG. 11 is a flow chart illustrating an example of processing for starting the mail application by the file management application. The processing in FIG. 11 is a subroutine of processing for instructing the mail application 302 to start in step S1005 in FIG. 10.

In step S1101, the file management application A305 generates a command for starting the mail application 302 using the values of the Message-ID and the mail folder acquired in step S1004 in FIG. 10. The start command uses the values of the Message-ID and the mail folder as well as the execution file path of the mail application 302. Thus, the mail application 302 can be started selecting the mail corresponding to the Message-ID at the time of starting.

In step S1102, the file management application A305 gives instructions to execute the command of starting the framework provided by the operating system. In step S1103, the operating system is instructed by the file management application A305 in step S1102 to perform the processing for starting the mail application 302.

In step S1104, the mail application 302 performs start processing using the starting command instructed in step S1103. The mail application 302 searches for a mail having the Message-ID included in the starting command from the mail folder included in the starting command. In step S1105, the mail application 302 determines whether the mail searched in step S1104 is found. If the mail is found (YES in step S1105), the processing proceeds to step S1106. If the mail is not found (NO in step S1105), the processing proceeds to step S1107.

In step S1106, the mail application 302 starts the mail application selecting the mail that is found in step S1104. In step S1107, the mail application 302 starts the mail application without selecting a mail. After processing in steps 1106 and S1107 is performed, the subroutine is ended.

Figure 12:
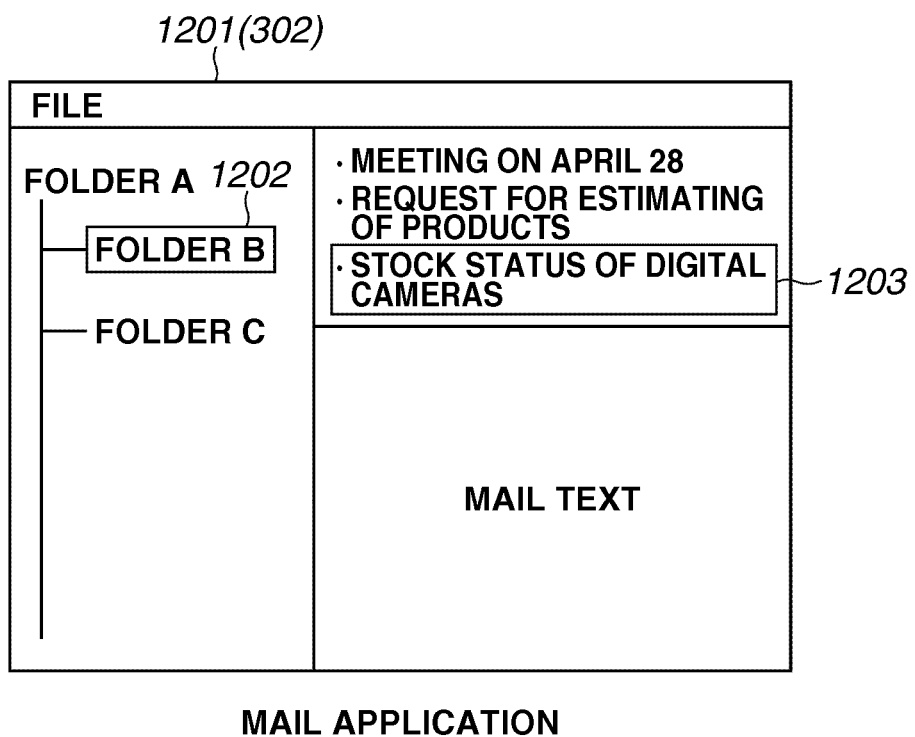
FIG. 12 illustrates the UI of the mail application in performing the start processing in step S1106 of FIG. 11.

FIG. 12 illustrates the UI of the mail application in performing the start processing in step S1106 in FIG. 11. A mail application 1201 in FIG. 12 is the same as the mail application 302. The mail application 1201 represents the UI of the mail application in performing the start processing in step S1106 in FIG. 11.

The mail application 1201 is started selectively displaying the mail, corresponding to the property information 903 of the storage mail 307 in FIG. 9. A title 1203 is "Stock status of digital cameras." The mail folder 1202 is "Folder B". While the Message-ID cannot be viewed on the UI of the mail application 1201, the Message-ID of the selected mail is the ID of the property information 903 and included in the starting command generated in step S1101.

FIG. 13 is an example of the starting command of the mail application. Starting commands 1301 and 1302 are commands for starting the mail application 302. The starting command 1301 is a command for starting the mail application 302 without selecting a mail. The starting command 1301 is executed in step S1107. The starting command 1302 is a command for starting the mail application 302 without selecting a mail. The starting command 1302 is executed in step S1106. The starting command 1302 includes the folder name and the Message-ID which are information about the mail selected in step S1106.

As described above, in the present exemplary embodiment, if the mail stored in the file management application is opened from the mail application in the operating system, the mail application can be started on the UI illustrated in FIG. 12 instead of the UI illustrated in FIG. 7.

As a result, the user can instantly confirm the text of the selected mail, the folder in which the selected mail is stored, and the title of the mail stored in the folder.

The first exemplary embodiment describes the method which finds the storage mail if the storage mail is opened and the mail application is started in a selected state. However, the configuration of a folder may be changed or a mail may be moved by the mail application after the mail is stored in the file management application. If the configuration of a folder is changed or a mail is moved by the mail application, the mail application cannot be started selecting the storage mail incase of the method for starting the mail application in the first exemplary embodiment because the mail cannot be found. A second exemplary embodiment describes processing performed in the case where a mail is not found.

In the second exemplary embodiment, new processing is added to the processing for starting the mail application by the file management application according to the first exemplary embodiment illustrated in FIG. 11.

Figure 14:
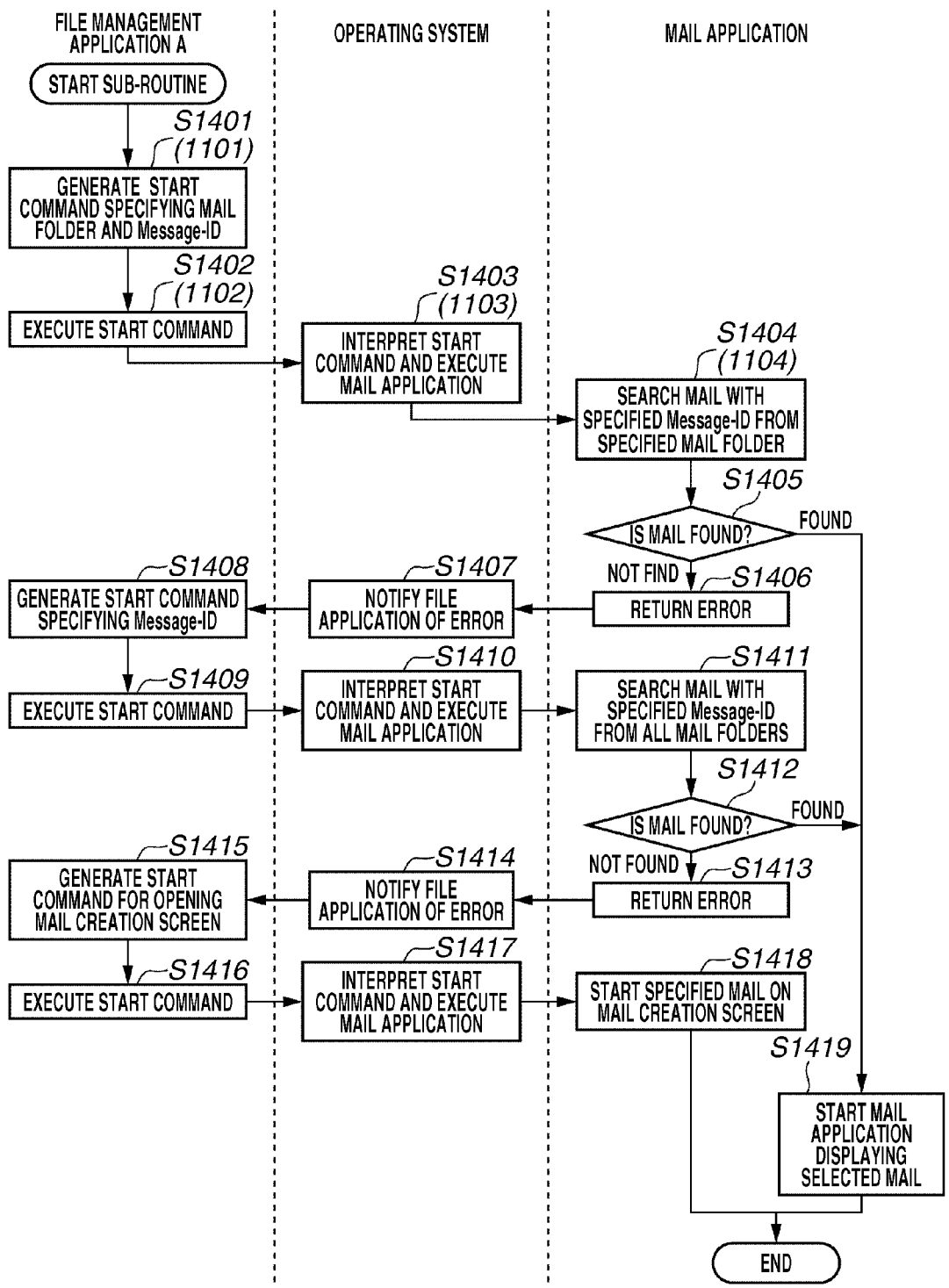
FIG. 14 is a flow chart illustrating an example of processing for starting the mail application by the file management application.

FIG. 14 is a flow chart illustrating an example of processing for starting the mail application by the file management application. Similarly to FIG. 11, FIG. 14 is a subroutine of processing for instructing the mail application 302 to start in step S1005 in FIG. 10.

The portions similar to those in FIG. 11 according the first exemplary embodiment are described in steps S1101 to 1104, so that the detailed description thereof is omitted herein. In step S1405, the mail application 302 determines whether the mail searched in step S1404 is found. If the mail is found (YES in step S1405), the processing proceeds to step S1419. If the mail is not found (NO in step S1405), the processing proceeds to step S1406. In step S1406, the mail application 302 notifies the operating system 301 that the mail is not found, as an error message.

In step S1407, the operating system 301 notifies the file management application A305 of the error received from the mail application 302. In step S1408, the file management application A305 generates a command for starting the mail application 302 using the Message-ID acquired in step S1004 illustrated in FIG. 10. This starting command can start the mail application 302 selecting the mail corresponding to the Message-ID at the time of starting.

In step S1409, the file management application A305 gives instructions to execute the command for starting the framework provided by the operating system. In step S1410, the operating system is instructed by the file management application A305 in step S1409 to perform the processing for starting the mail application 302.

In step S1411, the mail application 302 performs start processing using the starting command instructed in step S1410. The mail application 302 searches for a mail having the Message-ID included in the starting command. Unlike step S1404, the folder is not specified, so that the mail application 302 searches all the folders in the mail application 302.

In step S1412, the mail application 302 determines whether the mail searched in step S1411 is found. If the mail is found (YES in step S1412), the processing proceeds to step S1419. If the mail is not found (NO in step S1412), the processing proceeds to step S1413.

In step S1413, the mail application 302 notifies the operating system 301 that the mail is not found, as an error message. In step S1414, the operating system 301 notifies the file management application A305 of the error received from the mail application 302. In step S1415, the file management application A305 generates a command for starting the storage mail 307 on the mail editing screen.

In step S1416, the file management application A305 gives instructions for executing the command for starting the framework provided by the operating system. In step S1417, the operating system is instructed by the file management application A305 in step S1416 to perform the processing for starting the mail application 302.

In step S1418, the mail application 302 performs start processing using the starting command of instruction in step S1410. The mail application 302 starts the storage mail 307 included in the starting command on the editing screen without searching for a mail. The processing in step S1419 is similar to that in step S1106 illustrated in FIG. 11.

FIG. 15 is an example of the starting command for the mail application. Starting commands 1501, 1502, and 1503 start the mail application 302. The starting command 1501 is the same as the starting command 1302 illustrated in FIG. 13 according to the first exemplary embodiment, so that the detailed description thereof is omitted.

The starting command 1502 causes the mail application 302 to search for a mail having the Message-ID included in the starting command from all the folders and start in a selected state. The starting command 1502 uses the value of the Message-ID in FIG. 9.

The starting command 1503 causes the mail application 302 to start the storage mail 307 included in the starting command on the editing screen. The starting command 1503 uses the value of the file name illustrated in FIG. 9.

As described above, in the present exemplary embodiment, the mail application 302 performs processing for the case where the mail specified by the file management application A305 is not found in the mail application 302 in addition to the processing in the first exemplary embodiment. Thus, an effect equivalent to the first exemplary embodiment can be acquired even if the configuration of a folder is changed or a mail is moved after the mail application 302 stores a mail in the file management application A305.

The first and second exemplary embodiments improve the convenience of managing the storage mail in the file management application. However, the management of a plurality of the storage mails in the file management application causes the problem that the mail which the user wants to browse is difficult to find using only the file name of the storage mail. A third exemplary embodiment describes a determination process which makes it easier to find the mail which the user wants to browse from the plurality of the storage mails.

In the third exemplary embodiment, a process for changing the storage mail in the file management application A305 is added to the first and second exemplary embodiments. The third exemplary embodiment may be combined with either the first exemplary embodiment or the second exemplary embodiment.

Figure 16:
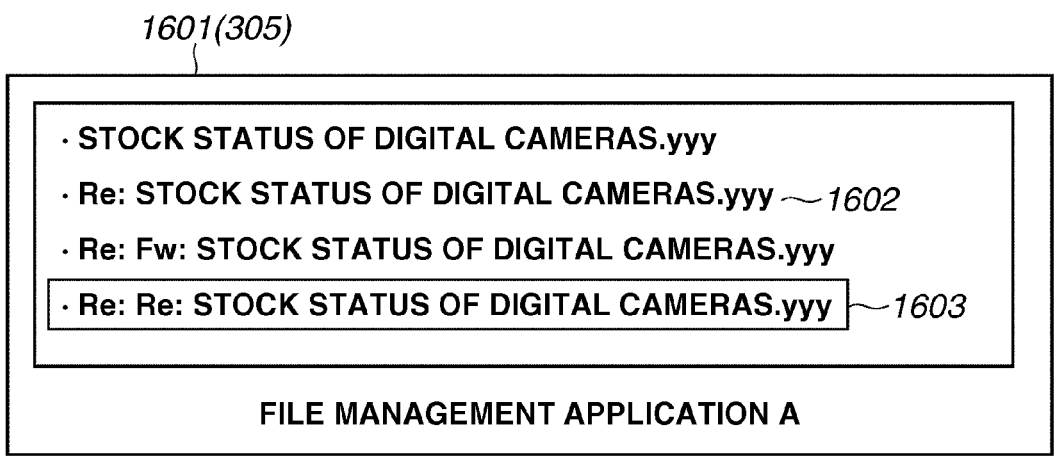
FIG. 16 is an example of a file management application adaptable to the present exemplary embodiment.

FIG. 16 is an example of a file management application adaptable to the present exemplary embodiment. As illustrated in FIG. 16, a file management application A1601 is the same as the file management application A305, so that the detailed description thereof is omitted. The file management application A1601 includes some folders and files.

A file management view 1602 is a management view for the file management application A1601. The file management view 1602 is similar to the file management view 306, however, a managed file is different in the present exemplary embodiment. The file management view 1602 manages four different storage mails. The storage mails have almost similar file names. A storage mail 1603 is managed by the file management application A1601.

Figure 17:
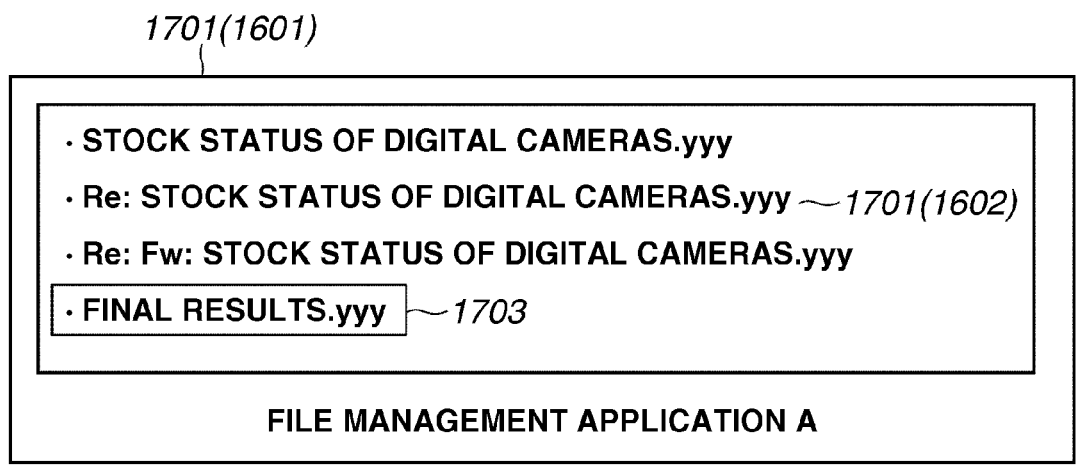
FIG. 17 is an example of a file management application adaptable to the present exemplary embodiment.

FIG. 17 is an example illustrating a file management application adaptable to the present exemplary embodiment. A file management application A1701 is the same as the file management application A1601. A file management view 1702 is the same as the file management view 1602. The detailed description thereof is omitted as 1601 and 1602 are put in FIG. 17.

The storage mail 1703 is managed by the file management application A1601. The storage mail 1703 is a mail that changes the file name of the storage mail 1603 in FIG. 16. The user can change the file name of the storage mail on the file management view 1702. If storage mails with similar file names are managed like the file management view 1602, it becomes easier for the user to discriminate contents between the storage mails by changing the file name of the storage mail. Thus, if the user changes the file name of the storage mail, the user tends to forget an original file name, which makes search by the mail application inconvenient. In the present exemplary embodiment, the user can restore the file name given when the storage mail is generated, to the original file name at any timing.

Figure 18:
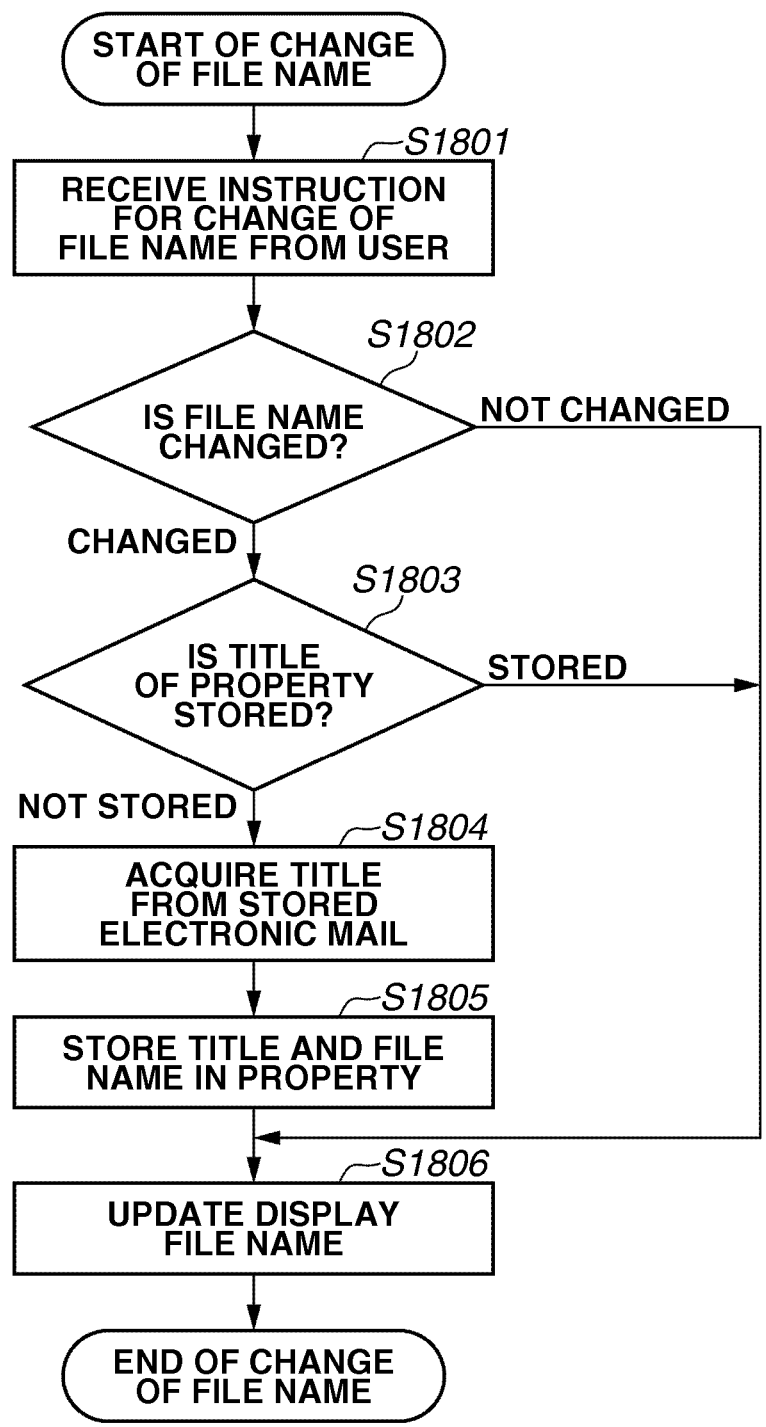
FIG. 18 is a flow chart illustrating an example of processing of the file management applications A1601 and A1701.

A flow chart for changing the file name of a mail stored in the file management application, according to the present exemplary embodiment is described below. FIG. 18 is a flow chart illustrating an example of processing of the file management applications A1601 and A1701. Since the file management application A1601 is the same as the file management application A1701, hereinafter, both are unified into the file management application A1701.

In step S1801, the file management application A1701 is instructed by the user to change the file name of the storage mail 1603. The file name of the storage mail 1603 can be changed by selecting the storage file on the file management view 1602.

In step S1802, the file management application A1701 determines whether the file name of the storage mail 1603 is changed. If the file name is changed (YES in step S1802), the processing proceeds to step S1803. If the file name is not changed (NO in step S1802), the processing proceeds to step S1806.

In step S1803, the file management application A1701 determines whether a title is stored in file property information. The file property information is the one in which the item of a title is added to the file property information 901. The file property information is described below in FIG. 19. If the title is not stored in the file property information (NO in step S1803), the processing proceeds to step S1804. If the title is stored in the file property information (YES in step S1803), the processing proceeds to step S1806.

In step S1804, the file management application A1701 acquires a title from the storage mail 1603. In step S1805, the file management application A1701 stores the title acquired in step S1804 and the file name in the file property information. In step S1806, the file management application A1701 updates the display name of the file management view 1602. The updated file management view 1602 is turned into the file management view 1702 and the file name of the storage mail 1703 is updated on the file management view 1602.

FIG. 19 illustrates an example of data structure generated by the file management application. A data structure 1901 is stored in the operating system 301 using the storage area of the ROM 103 or the hard disk 111 of the information processing apparatus and generated by the file management application A305 based on the instruction of the drag and drop. The data structure 1901 is property information of a file which the file management application A1701 uses to manage the file. Hereinafter, the data structure 1901 is referred to as file property information 1901.

The file property information 1901 stores information about the file displayed on the file management view 1702. The file property information 1901 is the one in which a title is added to the file property information 901 according to the first exemplary embodiment.

A proper item 1902 includes a file name and a title. Other items are the same as those of the property item 902. A property information 1903 is property information about the storage mail 1603 added to the file management application A1701 in step S1805. In other words, the file management application A1701 stores the file name of "Final result. yyy" determined as having been changed in step S1802, as a file name. Furthermore, the file management application A1701 stores the title of "Re:Re: Stock status of digital cameras" acquired in step S1804. Through this processing, the file management application A1701 can store an original title even if the user changes the file name of the storage mail 1603.

Figure 20:
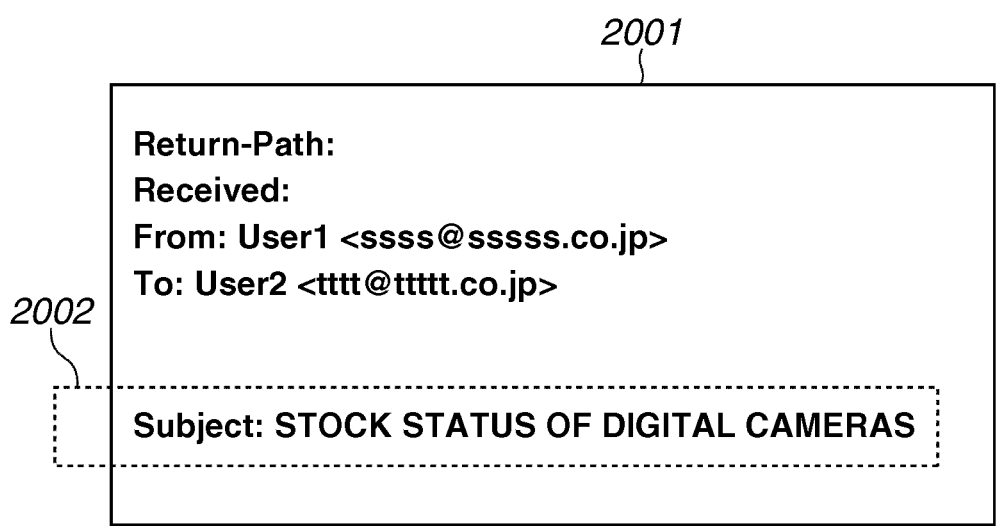
FIG. 20 illustrates an example of the data structure of a mail.

FIG. 20 illustrates an example of data structure of a mail. A data structure 3001 is included in the storage mail 1703. Among data structures, the data structure 3001 is information recorded when a mail is transmitted and received. Information 2002 generally called a mail header is information about a title in a mail header 2001. The file management application A1701 acquires the subject line of the storage mail 1703 from the mail header 2001 in step S1804.

FIG. 21 illustrates an example of a file management application adaptable to the present exemplary embodiment. In FIG. 21, 2101 to 2103 are the same as the file management application A1701. The detailed description thereof is omitted as 1701 to 1703 are put in FIG. 21. A context menu 2104 is prepared for the storage mail 2103. The user can display the context menu 2104 by selecting the storage mail 2103 and right-clicking thereon. The user instructs the file management application A1701 to restore the file name to the original file name via the context menu 2104. The file management application A1701, in response to an instruction by the context menu 2104, changes the file name of the storage mail 2103 using the subject line of the property information 1903.

As described above, in addition to the features of the first and second exemplary embodiments, the present exemplary embodiment restores the file name to the original file name by storing the file name and the subject line of the storage mail and receiving instructions from the user.

<Other Embodiments>

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-181634 filed Aug. 23, 2011, which is hereby incorporated by reference herein in its entirety.

What is claimed is:

1. An information processing apparatus comprising:
a memory;
a processor coupled to the memory which executes the following:
executing a mail application managing a plurality of electronic mails, wherein
if an electronic mail stored as a file is selected, determining whether information about storage location exists in attribute information of the electronic mail and, if the information about storage location exists in the attribute information of the electronic mail, acquiring mail identification information for identifying an electronic mail from the attribute information and issuing an instruction to start the mail application to display the selected electronic mail including the mail identification information and the information about storage location; and searching for the electronic mail identified by the mail identification information from the storage location indicated by the information about storage location based on the information about storage location and the mail identification information included in the instruction and, if the electronic mail is found, displaying the plurality of electronic mails managed by the mail application started by the instruction so that a user can distinct the selected electronic mail from among the plurality of electronic mails.

2. The information processing apparatus according to claim 1, wherein the processor further executes the following:
if operation for storing an electronic mail is performed, searching for the mail identification information from a mail header, stores the mail identification information in the attribute information of the electronic mail, adds the electronic mail to a file to be managed, and stores the information about storage location of the electronic mail in the attribute information of the electronic mail.

3. The information processing apparatus according to claim 1, wherein the processor further executes the following:
searching for the electronic mail identified by the mail identification information from the storage location indicated by the information about storage location based on the information about storage location and the mail identification information included in the instruction and, if the electronic mail is not found, sending back information indicating that the electronic mail is not found; and
on receipt of the information, issuing an instruction to start the mail application to display the selected electronic mail including the mail identification information.

4. The information processing apparatus according to claim 1, wherein the processor further executes the following:
if a file name of an electronic mail is changed by a user, determining whether a subject line is stored in the attribute information of the electronic mail and, if the subject line is not stored, acquiring the subject line from a storage mail in the electronic mail and stores the subject line and the changed file name in the attribute information of the storage mail.

5. An information processing method in an information processing apparatus executing a mail application configured to manage a plurality of electronic mail, the information processing method comprising:
determining whether information about storage location exists in attribute information of the electronic mail if an electronic mail stored as a file is selected;
acquiring mail identification information for identifying an electronic mail from the attribute information if the information about storage location exists in the attribute information of the electronic mail;
issuing an instruction to start the mail application to display the selected electronic mail including the mail identification information and the information about storage location;
searching for the electronic mail identified by the mail identification information from the storage location indicated by the information about storage location based on the information about storage location and the mail identification information included in the instruction; and
if the electronic mail is found, displaying the plurality of electronic mails managed by the mail application started by the instruction so that a user can distinct the selected electronic mail from among the plurality of electronic mails.

6. The information processing method according to claim 5, further comprising:
if operation for storing an electronic mail is performed, searching for the mail identification information from a mail header;
storing the mail identification information in the attribute information of the electronic mail;
adding the electronic mail to a file to be managed; and
storing the information about storage location of the electronic mail in the attribute information of the electronic mail.

7. The information processing method according to claim 5, further comprising:
searching for the electronic mail identified by the mail identification information from the storage location indicated by the information about storage location based on the information about storage location and the mail identification information included in the instruction;
sending back information indicating that the electronic mail is not found if the electronic mail is not found; and
on receipt of the information, issuing an instruction to start the mail application to display the selected electronic mail including the mail identification information.

8. The information processing method according to claim 5, further comprising:
if a file name of an electronic mail is changed by a user, determining whether a subject line is stored in the attribute information of the electronic mail;
if the subject line is not stored, acquiring the subject line from a storage mail in the electronic mail; and
storing the subject line and the changed file name in the attribute information of the storage mail.

9. A non-transitory computer readable storage medium storing a program causing a computer to execute an information processing method in an information processing apparatus executing a mail application configured to manage a plurality of electronic mails, the information processing method comprising:
if an electronic mail stored as a file is selected, determining whether information about storage location exists in attribute information of the electronic mail and, if the information about storage location exists in the attribute information of the electronic mail, acquiring mail identification information for identifying an electronic mail from the attribute information and issuing an instruction to start the mail application to display the selected electronic mail including the mail identification information and the information about storage location; and
searching for the electronic mail identified by the mail identification information from the storage location indicated by the information about storage location based on the information about storage location and the mail identification information included in the instruction and, if the electronic mail is found, displaying the plurality of electronic mails managed by the mail application started by the instruction so that a user can distinct the selected electronic mail from among the plurality of electronic mails.

* * * * *